US007817288B2

(12) United States Patent
Ishida et al.

(10) Patent No.: US 7,817,288 B2
(45) Date of Patent: Oct. 19, 2010

(54) DEVICE AND METHOD FOR MEASURING PROFILES OF ELECTRON BEAM AND LASER BEAM

(75) Inventors: Daisuke Ishida, Tokyo (JP); Hiroyuki Nose, Tokyo (JP); Namio Kaneko, Tokyo (JP); Mitsuru Uesaka, Tokyo (JP); Fumito Sakamoto, Tokyo (JP); Katsuhiro Dobashi, Tokyo (JP)

(73) Assignees: IHI Corporation, Tokyo (JP); The University of Tokyo, Tokyo (JP); National Institute of Radiological Sciences, Chiba (JP)

( * ) Notice: Subject to any disclaimer, the term of this patent is extended or adjusted under 35 U.S.C. 154(b) by 253 days.

(21) Appl. No.: 12/162,912

(22) PCT Filed: Mar. 7, 2007

(86) PCT No.: PCT/JP2007/054410

§ 371 (c)(1),
(2), (4) Date: Jul. 31, 2008

(87) PCT Pub. No.: WO2007/108320

PCT Pub. Date: Sep. 27, 2007

(65) Prior Publication Data

US 2009/0051937 A1 Feb. 26, 2009

(30) Foreign Application Priority Data

Mar. 23, 2006 (JP) ............................ 2006-080383

(51) Int. Cl.
*G01B 11/14* (2006.01)
*G01B 11/02* (2006.01)

(52) U.S. Cl. ...................................... 356/625; 356/635

(58) Field of Classification Search .......... 356/625–640
See application file for complete search history.

(56) References Cited

U.S. PATENT DOCUMENTS 4,602,272 A * 7/1986 Duschl ....................... 348/191

(Continued)

FOREIGN PATENT DOCUMENTS

JP 10-290053 10/1998

(Continued)

OTHER PUBLICATIONS

International Search Report issued in corresponding application No. PCT/JP2007/054410, completed May 28, 2007 and mailed Jun. 12, 2007.

(Continued)

*Primary Examiner*—Michael P Stafira
(74) *Attorney, Agent, or Firm*—Griffin & Szipl, P.C.

(57) ABSTRACT

A device for measuring profiles of an electron beam and a laser beam is provided with a profile measuring device 30 for measuring cross-section profiles of the beams in the vicinity of a collision position where an electron beam 1 and a laser beam 3 are brought into frontal collision, and a moving device 40 for continuously moving the profile measuring device in a predetermined direction which substantially coincides with the axial directions of the beams. Furthermore, based on the cross-section profiles measured by the profile measuring device, the position of the profile measuring device in the predetermined direction, and the oscillation timings of the beams, temporal changes in three-dimensional profiles of the electron beam and the laser beam are created by a profile creating device 50.

8 Claims, 7 Drawing Sheets

U.S. PATENT DOCUMENTS 4,797,619 A * 1/1989 Austin et al. ................ 324/409

FOREIGN PATENT DOCUMENTS

| | | |
|---|---|---|
| JP | 2001-338796 | 12/2001 |
| JP | 2004-069319 | 3/2004 |

OTHER PUBLICATIONS

K. Dobashi et al., "Development of Small-Sized Hard X-Ray Source Using X-Band linac", The 27th Linear Accelerator Meeting in Japan, Aug. 2002, pp. 118-120.

T. Omori, M. Fukuda, "Generation and Polarization Measurement of High-Quality, Short-Pulse Polarized Photon Beam", Nippon Butsuri Gakkaishi, vol. 58, No. 4, 2003, pp. 262-265.

F. Sakamoto, et al., "Emittance and Energy Measurements of Low-Energy Electron Beam Using Optical Transition Radiation Techniques," Japanese Journal of Applied Physics, vol. 44, No. 3, 2005, pp. 1485-1491.

* cited by examiner

DEVICE AND METHOD FOR MEASURING PROFILES OF ELECTRON BEAM AND LASER BEAM

This is a National Phase Application in the United States of International Patent Application No. PCT/JP2007/054410 filed Mar. 7, 2007, which claims priority on Japanese Patent Application No. 080383/2006, filed Mar. 23, 2006. The entire disclosures of the above patent applications are hereby incorporated by reference.

TECHNICAL FIELD

The present invention relates to a profile measuring device and method for measuring temporal changes in three-dimensional profiles of an electron beam and a laser beam.

BACKGROUND ART

It is known that a quasi-monochromatic X-ray resulting from Compton scattering is obtained by collision of an electron beam with a laser beam (for example, Non-Patent Document 1).

In "small-sized X-ray generating device" of Non-Patent Document 1, as shown in FIG. 1, an electron beam 82 accelerated by a small-sized accelerator 81 (X-band acceleration tube) is allowed to collide with pulse laser beam 83 to generate an X-ray 84. The multi-bunch electron beam 82 generated by an RF electron gun 85 (thermal RF gun) is accelerated by the X-band acceleration tube 81, and collides with the pulse laser beam 83. The hard X-ray 84 having a time width of 10 ns is generated by Compton scattering.

This device is miniaturized by using an X-band (11.424 GHz) corresponding to a frequency four times as high as that of an S-band (2.856 GHz) for general use in a linear accelerator as an RF. For example, it is predicted that the hard X-ray having an X-ray intensity (number of photons) of about $1\times10^9$ photons/s and a pulse width of about 10 ps is generated.

Further, means for measuring a profile of an electron beam or a laser beam is disclosed in Non-Patent Documents 2 and 3.

The profile measuring means disclosed in Non-Patent Document 2 is three chambers arranged at a collision point of an electron beam with a laser beam. The chambers are formed integrally with a beam pipe to maintain a vacuum of a beam line and to allow various diagnosis devices to be inserted in the beam line by remote control. Further, the profile measuring means measure positions and sizes of the electron beam and the laser beam. Each of the three chambers has a screen incorporated therein. In the central chamber, a combined scanner in which a wire scanner and a knife-edge scanner are formed integrally with each other is incorporated. By combining angle adjustment and parallel displacement of the laser beam, the positions of the electron beam and the laser beam are adjusted so as to be accurately matched with each other on the screens of the three chambers.

The profile measuring means disclosed in Non-Patent Document 3 is mounted with a fluorescent screen, a wire scanner, and an optical transition radiation (OTR) target.

[Non-Patent Document 1] K. Dobashi et al., "Development of Small-Sized Hard X-Ray Source Using X-Band linac", The 27th Linear Accelerator Meeting in Japan, 2002

[Non-Patent Document 2] T. Omori, M. Fukuda, "Generation and Polarization Measurement of High-Quality, Short-Pulse Polarized Photon Beam", Nippon Butsuri Gakkaishi, Vol. 58, No. 4, 2003

[Non-Patent Document 2] F. Sakamoto, et al., Japanese Journal of Applied Physics, Vol. 44, No. 3, 2005

DISCLOSURE OF THE INVENTION

Problems to be Solved by the Invention

An intensity Y of an X-ray generated by collision of the electron beam with the laser beam is represented by Expression (1) in which σ is a cross-section area of Compton scattering and L is luminosity at the collision.

$$Y=\sigma L \qquad (1)$$

Herein, the cross-section area of the scattering σ is considered as a physical constant which is uniquely given when an energy of the electron beam and a wavelength of the laser beam are determined. Accordingly, to increase the intensity of the X-ray, it is necessary to increase the luminosity L.

The luminosity L is represented by Expression (2).

[Expression 1]

$$\rho_e(x,y,z,t)\rho_l(x,y,z,t)dxdydzdt \qquad (2)$$

Herein, $\rho_e$ and $\rho_l$ are four-dimensional (space and time) density distributions (profiles) in the vicinity of a collision point of the electron beam with the laser beam.

Accordingly, the larger an overlap of the profiles of both of the beams in a space for four dimensions, the larger the luminosity L. To increase the luminosity L, it is necessary that the intensities of the electron beam and the laser beam are increased and both of the beams are matched with each other spatially and temporally.

Particularly, it is necessary to match the narrowed focus (beam waist) and the incident angle of the electron beam with those of the laser beam and allow a timing for passing through the collision point (position of beam waist) of the electron beam to collide with that of the laser beam.

The wire scanner disclosed in Non-Patent Documents 2 and 3 allows a wire to be moved on the beam line and measures the number of photons generated by scattering electrons with the wire. The knife-edge scanner allows a knife-edge to be mechanically scanned across the beam and obtains a beam profile by differentiating a power value during the scanning.

However, since it is necessary for the wire scanner and the knife-edge scanner to perform the scanning across the beam, there are problems in that measurement time is long and a two-dimensional momentary beam profile is not measured.

Further, even in the case where the three chambers are used as in Non-Patent Document 2, the profiles measured by the screens of the chambers were beam profiles at a position fixed with respect to the beam line. Accordingly, the focuses (beam waists) of the electron beam and the laser beam, of which the positions are not matched with a position on the screens, cannot be directly measured by the screens. As a result, it was very difficult to accurately match the focus and the incident angle of the electron beam with those of the laser beam.

Further, to increase the intensity Y of the X-ray generated by the collision at the position of the focus in the case where the electron beam and the laser beam are a pulse beam, it is strongly desired to accurately measure the four-dimensional profiles (temporal changes in three-dimensional profiles) of the beams.

SUMMARY OF THE INVENTION

The invention is contrived to solve the above-described problems. That is, an object of the invention is to provide a device and method for measuring profiles of an electron beam and a laser beam, which are capable of accurately matching the focus and the incident angle of the electron beam with those of the laser beam, of measuring four-dimensional profiles (temporal changes in three-dimensional profiles) of the electron beam and the laser beam, and of thereby remarkably increasing utilization efficiency of the laser beam.

According to the invention, there is provided a device for measuring profiles of an electron beam and a laser beam including: a profile measuring device for measuring cross-section profiles of the beams in the vicinity of a collision position where the electron beam and the laser beam are brought into frontal collision; and a moving device for continuously moving the profile measuring device in a predetermined direction which substantially coincides with the axial directions of the beams.

According to a preferred embodiment of the invention, there is further provided a profile creating device for creating temporal changes in three-dimensional profiles of the beams based on the cross-section profiles measured by the profile measuring device, the position of the profile measuring device in the predetermined direction, and the oscillation timings of the beams.

Further, the moving device includes a linear actuator for continuously moving the profile measuring device in the predetermined direction and a position detecting device for detecting the position of the profile measuring device in the predetermined direction.

According to a preferred embodiment of the invention, the profile measuring device includes a flat target plate which is disposed at a predetermined angle with respect to the predetermined direction, a first photodetector for measuring a two-dimensional profile of an optical transition radiation generated by collision of the target plate with the electron beam, and a second photodetector for measuring a two-dimensional profile of the laser beam reflected on the target plate.

According to another preferred embodiment of the invention, the profile measuring device includes a flat target plate which is disposed at a predetermined angle with respect to the predetermined direction, a single photodetector for measuring two-dimensional profiles of an optical transition radiation and the laser beam, a first reflection mirror system for directing the optical transition radiation generated by collision of the target plate with the electron beam to the photodetector, and a second reflection mirror system for directing the laser beam reflected on the target plate to the photodetector.

According to further another preferred embodiment of the invention, the profile measuring device includes a single photodetector for measuring two-dimensional profiles of an optical transition radiation and the laser beam, a first flat target plate which is disposed at a predetermined angle with respect to the predetermined direction and directs the optical transition radiation generated by collision with the electron beam to the photodetector, and a second target plate which is disposed at a predetermined angle with respect to the predetermined direction and reflects the laser beam to the photodetector.

According to still further another preferred embodiment of the invention, the profile measuring device includes a first profile measuring device which is disposed at a right angle with respect to the predetermined direction and measures a two-dimensional profile of the electron beam and a second profile measuring device which is disposed at a right angle with respect to the predetermined direction and measures a two-dimensional profile of the laser beam.

Further, according to the invention, there is provided a method of measuring profiles of an electron beam and a laser beam, including: a continuous moving step of continuously moving a profile measuring device for continuously measuring cross-section profiles of the beams in the vicinity of a collision position where the electron beam and the laser beam are brought into frontal collision in a predetermined direction which substantially coincides with the axial directions of the beams; and a profile creating step of creating temporal changes in three-dimensional profiles of the beams based on the cross-section profiles obtained in the continuous moving step, the position of the profile measuring device in the predetermined direction, and the oscillation timings of the beams.

According to the device and method of the invention, since the moving device continuously moves the profile measuring device in the predetermined direction which substantially coincides with the axial directions of the electron beam and the laser beam, the profile measuring device can measure the two-dimensional profiles of the electron beam and the laser beam at each position in the predetermined direction.

Accordingly, even when the positions of the focuses (beam waists) of the electron beam and the laser beam are not matched with a specified position (for example, collision-predetermined point), the focuses can be directly measured by moving the profile measuring device to the specified position.

Further, from the central positions of the beams in the predetermined direction, the incident angles of the beams can be directly measured.

Accordingly, the focus and the incident angle of the electron beam and those of the laser beam can be accurately matched with each other.

In addition, by using the profile creating device, four-dimensional profiles (temporal changes in three-dimensional profiles) of the electron beam and the laser beam can be created based on the cross-section profiles measured by the profile measuring device, the position of the profile measuring device in the predetermined direction, and the oscillation timings of the beams.

BEST MODE FOR CARRYING OUT THE INVENTION

Figure 1:
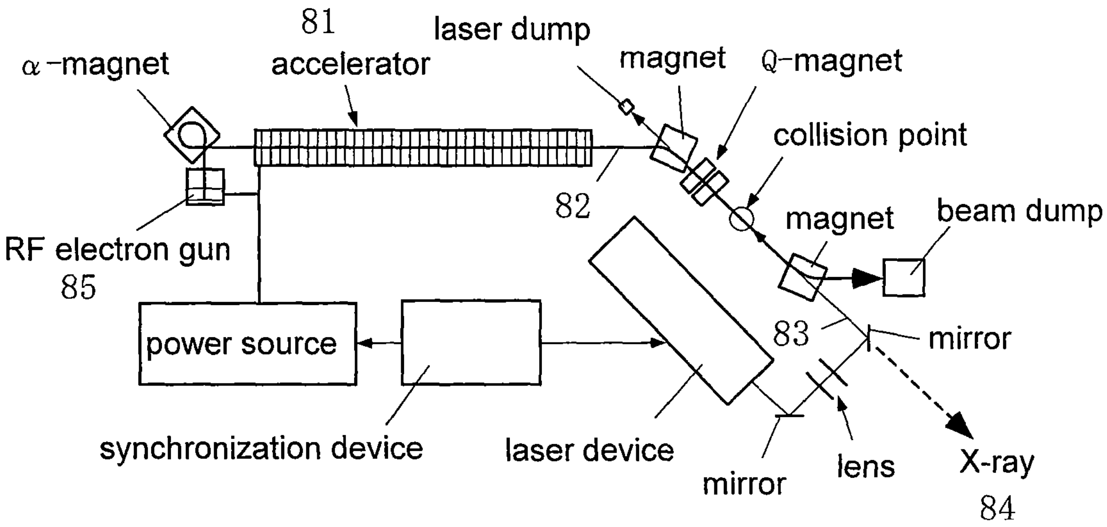
Fig.1 Prior Art
FIG. 1 is a diagram showing the configuration of a "small-sized X-ray generating device" of Non-Patent Document 1.

Hereinafter, preferred embodiments of the invention will be described with reference to the drawings. It is to be noted that, in the drawings, a common part is denoted with the same reference numeral, and redundant description is omitted.

Figure 2:
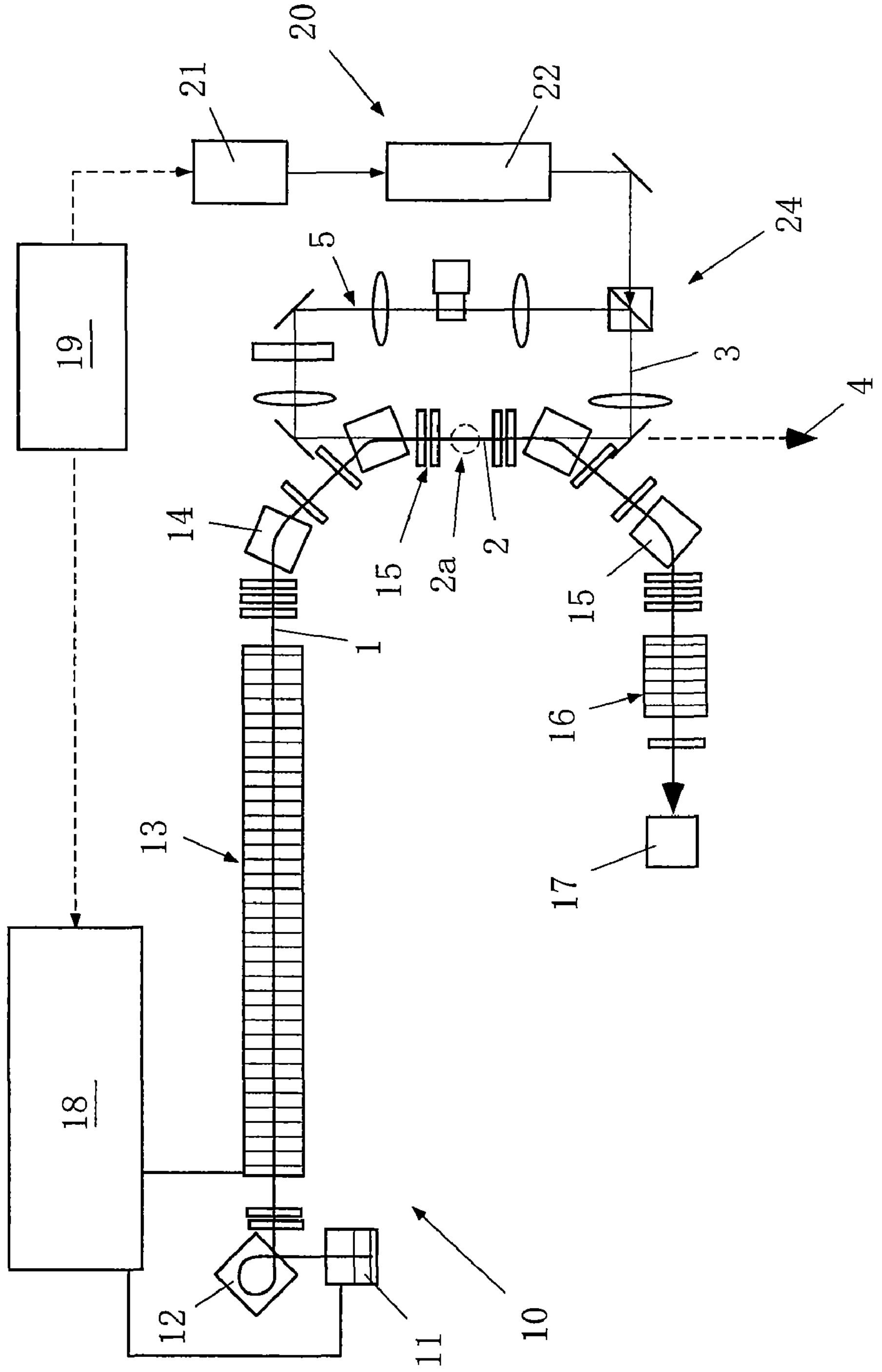
FIG. 2 is a diagram showing the whole configuration of an X-ray generating device including a profile measuring device according to the invention.

FIG. 2 is a diagram showing the whole configuration of an X-ray generating device including a profile measuring device according to the invention. The X-ray generating device has an electron beam generating device 10 and a laser generating device 20.

The electron beam generating device 10 has a function of accelerating an electron beam to generate a pulse electron beam 1 and transmitting the beam through a predetermined rectilinear orbit 2.

In this example, the electron beam generating device 10 includes an RF electron gun 11, an α-magnet 12, an acceleration tube 13, a bending magnet 14, Q-magnets 15, a deceleration tube 16, and a beam dump 17.

The RF electron gun 11 and the acceleration tube 13 are driven by a high-frequency power source 18 of an X-band (11.424 GHz). An orbit of the electron beam drawn from the RF electron gun 11 is changed by the α-magnet 12. The beam then enters the acceleration tube 13. The acceleration tube 13 is a small-sized X-band acceleration tube which accelerates the electron beam to generate a high-energy electron beam of preferably about 50 MeV. This electron beam is the pulse electron beam 1 of, for example, about 1 μs.

Particularly, the pulse electron beam 1 may be a multi-bunch pulse electron beam. The reason is that it is necessary to generate the electron beam of which the circulation time is longer than that (about 10 ns) of the laser beam in order to allow the circulating laser beam to collide with one mass of electrons more than once.

The bending magnet 14 bends the orbit of the pulse electron beam 1 with a magnetic field, transmits the beam through the predetermined rectilinear orbit 2, and guides the transmitted pulse electron beam 1 to the beam dump 17. A convergence degree of the pulse electron beam 1 is adjusted by the Q-magnet 15. The pulse electron beam 1 is decelerated by the deceleration tube 16. The beam dump 17 traps the pulse electron beam 1 transmitted through the predetermined rectilinear orbit 2 to prevent leakage of radiation.

A synchronization device 19 executes control so that the electron beam generating device 10 is synchronized with the laser generating device 20, a timing of the pulse electron beam 1 collides with that of a pulse laser beam 3 to be described later, and the pulse electron beam 1 collides with the pulse laser beam 3 at a collision point 2*a* on the predetermined rectilinear orbit 2.

By the electron beam generating device 10 described above, the pulse electron beam 1 of, for example, about 50 MeV, about 1 μs can be generated and transmitted through the predetermined rectilinear orbit 2.

The laser generating device 20 has a laser device 21 and a variable beam expander 22, and has a function of generating a laser beam, expanding a diameter of the laser beam to a predetermined beam diameter, and irradiating the expanded laser beam.

For example, the laser device 21 uses an Nd-YAG laser having a wavelength of 1064 nm. The pulse laser beam 3 is not limited to this example, and ArF (wavelength of 193 nm), KrF (wavelength of 248 nm), XeCl (wavelength of 308 nm), XeF (wavelength of 351 nm) or Fe (wavelength of 157 nm) of an excimer laser, a third higher harmonic wave (wavelength of 355 nm), a fourth higher harmonic wave (wavelength of 266 nm) or a fifth higher harmonic wave (wavelength of 213 nm) of a YAG laser or the like may be used.

In this example, the laser generating device 20 has an optical system for laser beam circulation 24, directs the pulse laser beam 3 into a circulation path 5 via a reflection mirror, traps the pulse laser beam 3 inside the circulation path 5, and repeatedly transmits the beam through a laser beam converging point 9 (not shown, see FIG. 4C for reference) in the circulation path.

According to the invention, the laser beam may be a continuous laser beam and the laser device 21 may be a continuous laser device. However, it is preferable that the laser beam is the pulse laser beam 3 and the laser device 21 is a pulse laser device.

The profile measuring device according to the invention is not limited to the above-described X-ray generating device and can be applied to other X-ray generating devices in which the electron beam and the laser beam are brought into frontal collision.

Hereinafter, a description will be given to the case where the laser beam 3 is a pulse laser beam and the laser device 21 is a pulse laser device.

In FIG. 2, the electron beam 1 (in this example, pulse electron beam) and the laser beam 3 (in this example, pulse laser beam) are controlled so as to be brought into frontal collision at the collision point 2*a* on the predetermined rectilinear orbit 2.

The electron beam 1 is controlled in such a manner that the orbit of the electron beam 1 is controlled by the bending magnet 14, the convergence degree of the pulse electron beam 1 is controlled by the Q-magnets 15, and the arrival time of the pulse electron beam 1 to the collision point 2*a* is controlled by the synchronization device 19.

The laser beam 3 is controlled in such a manner that the orbit of the laser beam 3 is controlled by the reflection mirror or the lateral position of a condenser, the converging position of the laser beam 3 is controlled by the axial position of the condenser, and the arrival time of the laser beam 3 to the collision point 2*a* is controlled by the synchronization device 19.

The profile measuring device according to the invention is not limited to this control means and may allow other means to control the electron beam 1 and the laser beam 3.

Figure 3A:
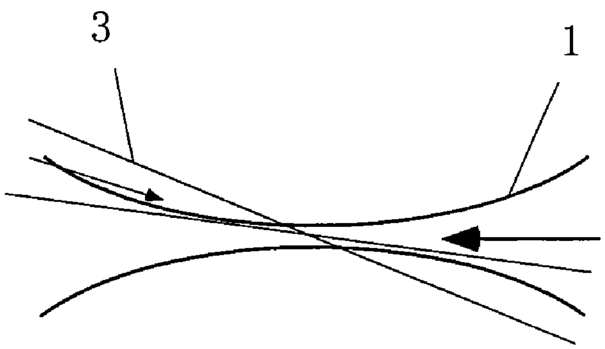
FIG. 3A is a diagram showing an aspect in which an electron beam collides with a laser beam.
Figure 3B:
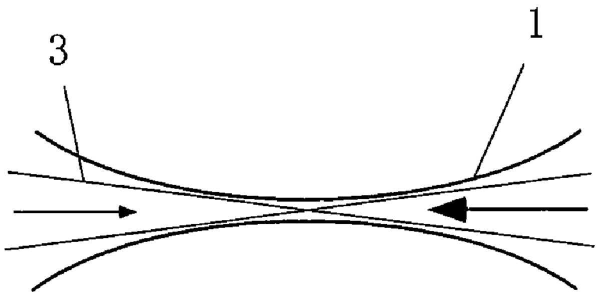
FIG. 3B is a diagram showing another aspect in which the electron beam collides with the laser beam.

FIGS. 3A to 3D shows collision modes of the electron beam 1 and the laser beam 3. FIG. 3A shows the state in which the focuses (beam waists) and the incident angles of the beams are not matched with each other, and FIG. 3B shows the state in which the focuses and the incident angles of the beams are matched with each other. Hereinafter, the above focus and the beam waist are referred to as "focus".

As shown in FIG. 3A, when the focus and the incident angle of the electron beam 1 are not matched with those of the laser beam 3, an overlap of the profiles of the beams is small, and the intensity of the X-ray generated by collision is thereby weak.

Therefore, to increase the intensity of the generated X-ray, it is necessary to match the focus and the incident angle of the electron beam 1 with those of the laser beam 3, as shown in FIG. 3B.

Figure 3C:
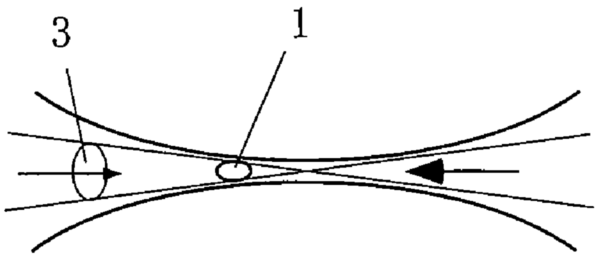
FIG. 3C is a diagram showing further another aspect in which the electron beam collides with the laser beam.
Figure 3D:
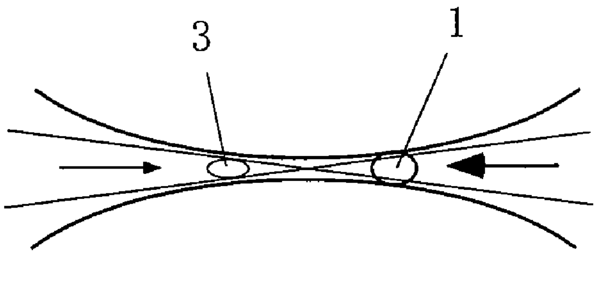
FIG. 3D is a diagram showing still further another aspect in which the electron beam collides with the laser beam.

In the case where the electron beam and the laser beam are a pulse beam, FIG. 3C shows a state in which the beams do not simultaneously pass through the focus, and FIG. 3D shows a state in which the beams simultaneously passes through the focus.

As shown in FIG. 3C, when the electron beam 1 collides with the laser beam 3 at a position other than the focus, the density distribution at the time of collision of the electron beam with the laser beam is low, and the intensity of the generated X-ray is thereby weak.

Therefore, to increase the intensity of the generated X-ray, it is necessary to execute control so that the electron beam 1 and the laser beam 3 simultaneously pass through the focus, as shown in FIG. 3D.

The basic concept of the invention is that, by moving the profile measuring device to be described later in a predetermined direction which substantially coincides with the axial directions of the beams, the positions and the distributions of the electron beam 1 and the laser beam 3 are measured over the whole range in which the device is movable.

If the beam waists (focuses) of the electron beam 1 and the laser beam 3 matched with each other can be directly measured, a position where the smallest beam size is measured can be decided as the beam waist (focus) to increase collision efficiency of the electron beam 1 and the laser beam 3.

When the electron beam and the laser beam are a pulse beam, it is necessary that the electron beam and the laser beam are simultaneously converged and pass through a position as the focus, as shown in FIG. 3D.

An object of the device and method according to the invention is to easily realize the state of FIG. 3D.

Figure 4A:
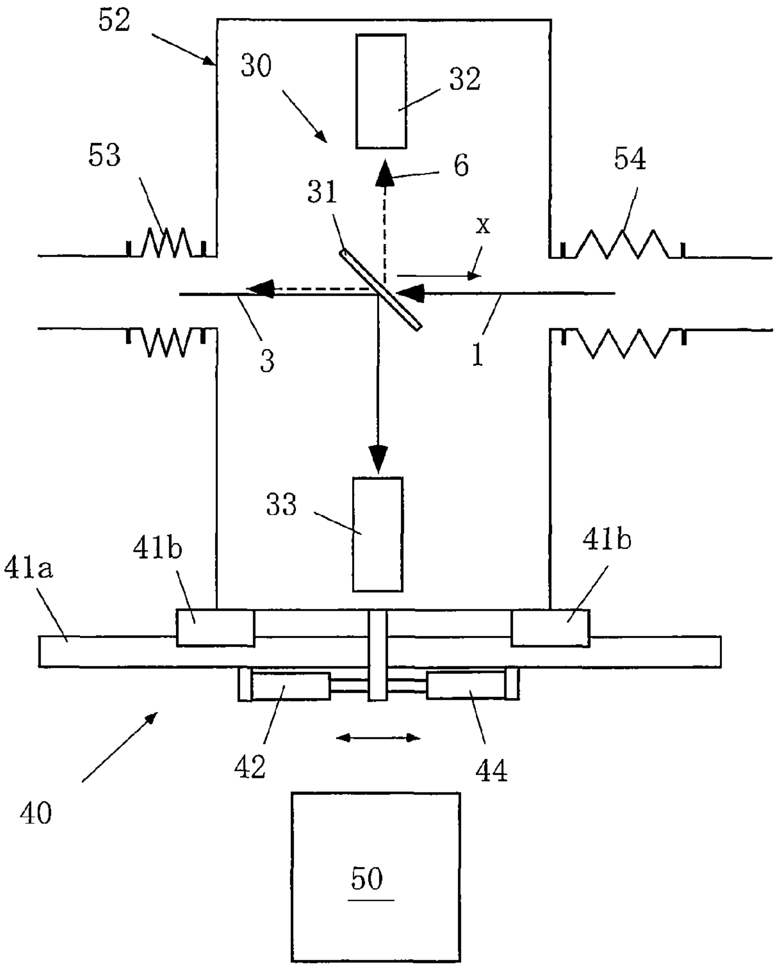
FIG. 4A is a diagram showing a first embodiment of the profile measuring device according to the invention.
Figure 4B:
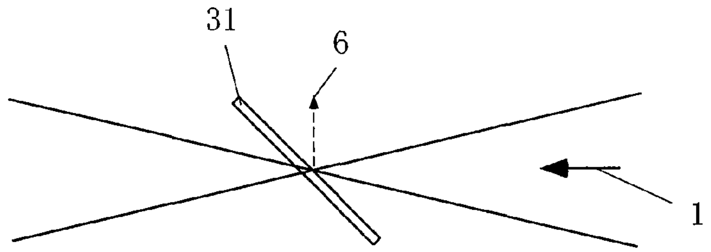
FIG. 4B is a diagram schematically showing a generating state of an optical transition radiation according to the invention.
Figure 4C:
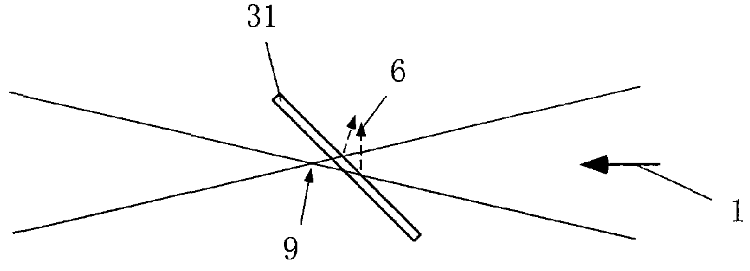
FIG. 4C is a diagram schematically showing another generating state of the optical transition radiation according to the invention.

FIGS. 4A to 4C are diagrams showing a first embodiment of the profile measuring device according to the invention.

In FIG. 4A, the profile measuring device according to the invention includes a profile measuring device 30, a moving device 40, and a profile creating device 50.

In the invention, a predetermined direction which substantially coincides with the axial directions of the electron beam 1 and the laser beam 3 is defined as an x direction. This x direction is the same as the rectilinear orbit 2 designed in FIG. 2. The collision point 2*a* designed in the same drawing may be set as an origin. The axial directions of the electron beam 1 and the laser beam 3 may not be exactly matched with the x direction in the actual use.

In this example, the profile measuring device 30 has a flat target plate 31, a first photodetector 32, and a second photodetector 33.

The flat target plate 31 is preferably made of metal and disposed at a predetermined angle (for example, 45°) with respect to the above-described x direction. The target plate 31 may be preferably a target for optical transition radiation (for example, an aluminum vapor deposition mirror).

The first photodetector 32 is a photomultiplier or a streak camera and continuously measures a two-dimensional profile of an optical transition radiation 6 generated by collision of the target plate 31 with the electron beam 1. The optical transition radiation 6 is emitted when the electron beam 1 passes through the target plate 31. Accordingly, by measuring the time direction distribution of this optical transition radiation with the first photodetector 32 (the photomultiplier or streak camera), it is possible to accurately know a timing at which the electron beam passes through the collision point.

The second photodetector 33 measures a two-dimensional profile of the laser beam 3 reflected on the target plate 31. Since the target plate 31 (in this example, target for optical transition radiation) can be used as the reflection mirror for the laser beam 3, a timing at which the laser beam 3 passes through the collision point can be measured. These timings are compared with each other and properly combined to maximize the intensity of the X-ray.

Further, a projection image generated by collision of the target plate 31 with the laser beam 3 can be measured while the two-dimensional profile of the optical transition radiation 6 generated by collision of the target plate 31 with the electron beam 1 is measured by the first photodetector 32. In this case, the second photodetector 33 is not necessary.

With this configuration, cross-section profiles of the electron beam 1 and the laser beam 3 in the vicinity of the collision position (collision point 2*a*) at which the electron beam 1 and the laser beam 3 are brought into frontal collision can be continuously measured.

That is, when the spatial position of the laser beam 3 are matched with that of the electron beam 1, directly comparing the time distributions of the laser beam 3 and the optical transition radiation 6 emitted from the target for optical transition radiation (metal mirror) with each other is the most effective to know a temporal relation between laser beam 3 and the electron beam 1.

In this drawing, reference numeral 52 denotes a vacuum chamber which houses the profile measuring device 30, and reference numerals 53 and 54 denote vacuum bellows. The vacuum bellows connect the vacuum chamber 52 integrally to a beam pipe to maintain a vacuum of a beam line and allow the vacuum chamber 52 to move in the x direction.

In this example, the moving device 40 has a linear actuator 42 and a position detecting device 44.

In addition, in this drawing, reference numeral 41*a* denotes a rail, and reference numerals 41*b* denote guides. The guides 41*b* are fixed to the vacuum chamber 52 and accurately directs the vacuum chamber 52 (and the profile measuring device 30 therein) in the x direction along the rail 41*a*.

The linear actuator 42 is a linear electric motor or hydraulic cylinder and continuously moves in the x direction of the target plate 31. Further, the linear actuator 42 may include a rotation actuator and a linear mechanism (for example, rack pinion).

The position detecting device 44 is, for example, a magnescale (registered trade name) and accurately detects the position in the x direction of the target plate 31 during movement with a resolution of preferably 10 μm or less.

With this configuration, the profile measuring device 30 can continuously move in the x direction which substantially coincides with the axial directions of the electron beam 1 and the laser beam 3, and the position of the device in the x direction can be accurately detected.

In this drawing, while the electron beam 1 is incident on the metal target 31 installed at an angle of, for example, 45°, the optical transition radiation 6 is generated in an upper direction of this drawing. By converting a temporal difference between the optical transition radiation 6 and the laser beam 3 into electric signals with the photomultiplier or the like, and measuring a temporal difference of the signals, it is possible to know a temporal difference at the collision point between the electron beam 1 and the laser beam 3.

It should be noted, however, that delay time of the two photodetectors 32 and 33 is known, and it is necessary to exactly know whether a difference between optical paths from the target 31 to each of the photodetectors is none or the difference is accurately known.

FIG. 4B schematically shows a generating state of the optical transition radiation 6. When the focus of the electron beam 1 is on a surface of the metal target 31 (thick solid lines), the optical transition radiation 6 is generated from a small area (for example, elliptical) corresponding to the focus on the metal target 31.

As shown in FIG. 4C, when the focus of the electron beam 1 is not on the surface of the metal target 31 (thin lines), the weak optical transition radiation 6 is generated from an area larger than the focus on the metal target 31.

Accordingly, it can be found that by moving the metal target 31, the focus of the electron beam 1 is positioned at an area where the strongest optical transition radiation 6 is generated from the smallest area.

It is also true in the case of laser beam.

The profile creating device 50 is, for example, a PC (a computer) and creates temporal changes in three-dimensional profiles of the electron beam 1 and the laser beam 3 based on the cross-section profiles measured by the profile measuring device 30, the position of the profile measuring device in the x direction, and the oscillation timings of the beams.

The temporal changes in the three-dimensional profiles obtained by the profile creating device 50 is stored in a storage device, outputted to a display device or a print device (not shown), and outputted to the above-described synchronization device 19.

Figure 5:
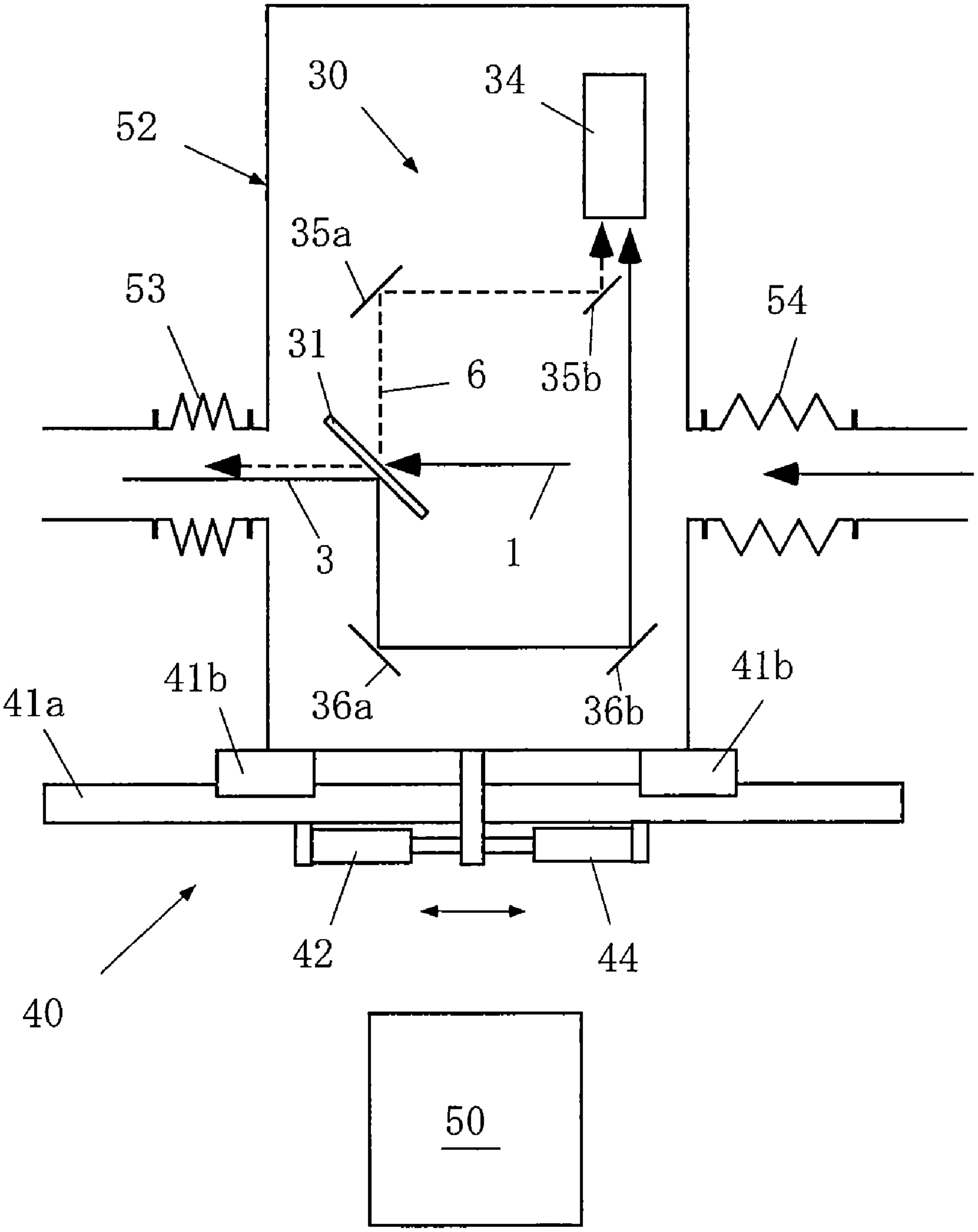
FIG. 5 is a diagram showing a second embodiment of the profile measuring device according to the invention.

FIG. 5 is a diagram showing a second embodiment of the profile measuring device according to the invention.

In this example, the profile measuring device 30 has the flat target plate 31, a single photodetector 34, first reflection mirror systems 35*a* and 35*b*, and second reflection mirror systems 36*a* and 36*b*.

As in the first embodiment, the flat target plate 31 is preferably made of metal and disposed at a predetermined angle (for example, 45°) with respect to the above-described x direction.

The single photodetector 34 measures the two-dimensional profiles of the optical transition radiation 6 and the laser beam 3.

In this example, the first reflection mirror systems 35*a* and 35*b* include two reflection mirrors 35*a* and 35*b*, and direct the optical transition radiation 6 generated by collision of the target plate 31 with the electron beam 1 to the photodetector 34.

In this example, the second reflection mirror systems 36*a* and 36*b* include two reflection mirrors 36*a* and 36*b*, and direct the laser beam 3 reflected on the target plate 31 to the same photodetector 34. It is preferable that optical path lengths of the first reflection mirror systems 35*a* and 35*b* and the second reflection mirror systems 36*a* and 36*b* be accurately matched with each other.

The rest of the configuration is the same as in the first embodiment.

In this example, the one photodetector 34 is set and an optical path behind the metal target 31 is a proper optical transport system. According to this configuration, if a difference between the optical path of the laser beam 3 and the optical path of the optical transition radiation 6 become known or 0, the photodetector 34 can measure the difference by two pulse signals having a temporal difference therebetween.

With this configuration, the single photodetector 34 can measure the two-dimensional profiles of the optical transition radiation 6 and the laser beam 3. The optical transition radiation 6 and the laser beam 3 may be simultaneously measured and separated from each other by a difference in wavelength, or may be independently measured.

Accordingly, as in the first embodiment, with this configuration, the cross-section profiles of the electron beam 1 and the laser beam 3 in the vicinity of the collision position (collision point 2*a*) where the electron beam 1 and the laser beam 3 are brought into frontal collision can be continuously measured.

Figure 6:
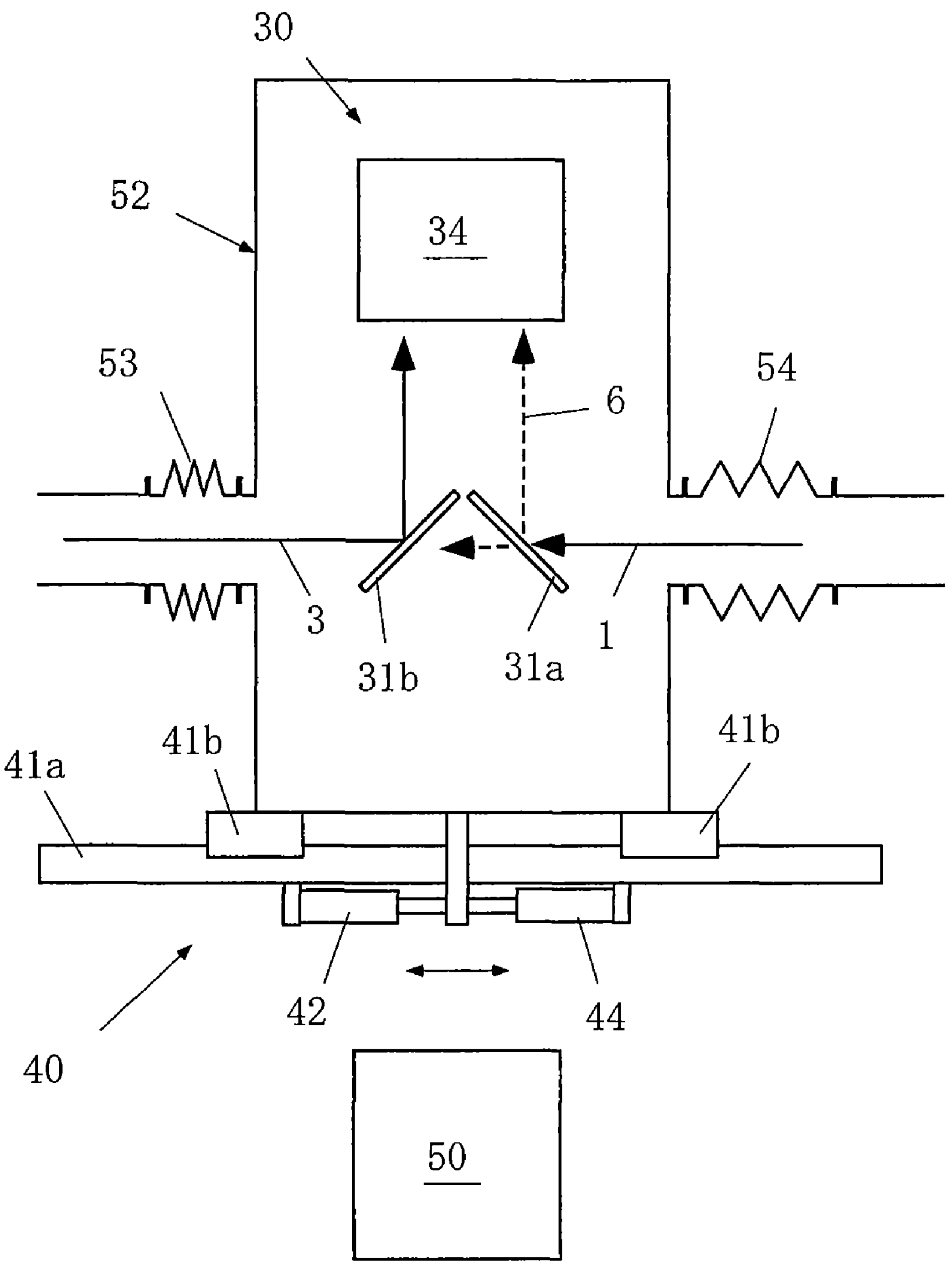
FIG. 6 is a diagram showing a third embodiment of the profile measuring device according to the invention.

FIG. 6 is a diagram showing a third embodiment of the profile measuring device according to the invention.

In this example, the profile measuring device 30 has the single photodetector 34, a first flat target plate 31*a*, and a second flat target plate 31*b*.

Like the above-described target plate 31, the flat target plate 31*a* is preferably made of metal and disposed at a predetermined angle (for example, 45°) with respect to the above-described x direction.

As in the second embodiment, the single photodetector 34 measures the two-dimensional profiles of the optical transition radiation 6 and the laser beam 3.

The second flat target plate 31*b* is disposed at a predetermined angle (for example, 45°) with respect to the predetermined x direction, and reflects the laser beam 3 to the same photodetector 34. That is, the first and second target plates 31*a* and 31*b* direct the optical transition radiation 6 and the laser beam 3 to the same photodetector 34.

It is preferable that optical path lengths from the first and second target plates 31*a* and 31*b* to the photodetector 34 be accurately matched with each other.

Preferably, the moving device 40 continuously moves the first and second target plates 31*a* and 31*b* by a distance exceeding its length in the x direction to allow the positions in the x direction of the first and second target plates 31*a* and 31*b* during movement to be accurately detected.

The rest of the configuration is the same as in the first and second embodiments.

In this example, by providing the two metal targets 31*a* and 31*b* for laser and optical transition radiation, the optical path difference is caused only by the part of the metal targets. As shown in the drawing, the second target plate 31*b* tilted at 45° in an opposite direction is installed on the back of the optical transition radiation target (first target plate 31*a*).

When the spatial positions of the laser beam and the electron beam are accurately adjusted in advance by a fluorescent screen, it can be detected which part of the target the laser beam or the electron beam passes through. Accordingly, the optical path difference between the laser beam and the optical transition radiation becomes known.

With this configuration, the single photodetector 34 can measure the two-dimensional profiles of the optical transition radiation 6 and the laser beam 3 by the first and second target plates 31*a* and 31*b*. The optical transition radiation 6 and the laser beam 3 may be simultaneously measured and separated from each other by the difference in wavelength, or may be independently measured.

Accordingly, as in the first and second embodiments, with this configuration, the cross-section profiles of the electron beam 1 and the laser beam 3 in the vicinity of the collision position (the collision point 2*a*) where the electron beam 1 and the laser beam 3 are brought into frontal collision can be continuously measured.

Figure 7:
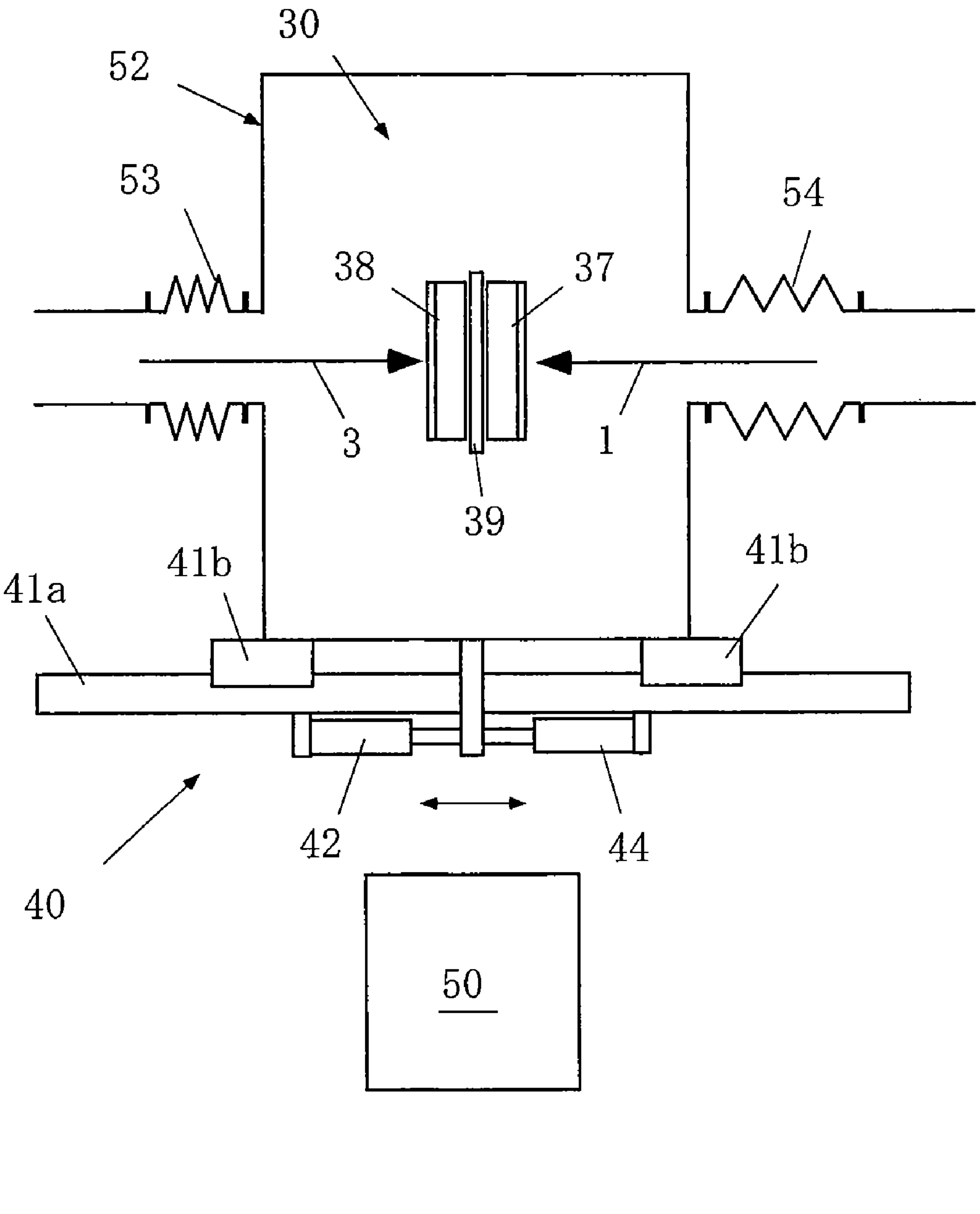
FIG. 7 is a diagram showing a fourth embodiment of the profile measuring device according to the invention.

FIG. 7 is a diagram showing a fourth embodiment of the profile measuring device according to the invention.

In this example, the profile measuring device 30 has a first profile measuring device 37 and a second profile measuring device 38.

The first profile measuring device 37 is a beam profiler for electron beam and disposed at a right angle (vertical) with respect to the above-described x direction to directly measure the two-dimensional profile of the electron beam 1.

Further, the second profile measuring device 38 is a beam profiler for laser beam and disposed at a right angle with respect to the x direction to directly measure the two-dimensional profile of the laser beam 3.

Between the first and second profile measuring devices 37 and 38, a shielding plate 39 may be inserted for shielding the electron beam and the laser beam.

Preferably, in this example, the moving device 40 continuously moves the first and second profile measuring devices 37 and 38 by a distance exceeding its length in the x direction to allow the positions in the x direction of the first and second profile measuring devices 37 and 38 during movement to be accurately detected.

The rest of the configuration is the same as in the first to third embodiments.

A profile measuring method according to the invention, using the above-described profile measuring device according to the invention, includes a continuous moving step S1 and a profile creating step S2.

In the continuous moving step S1, the above-described profile measuring device 30 is continuously moved in the x direction which substantially coincides with the axial directions of the electron beam 1 and the laser beam 3 in the vicinity of the collision point 2*a* where the electron beam 1 and the laser beam 3 are brought into frontal collision.

In the profile creating step S2, the temporal changes in the three-dimensional profiles of the electron beam 1 and the laser beam 3 are created based on a number of the cross-section profiles obtained in the continuous moving step S1, the position of the profile measuring device in the x direction, and the oscillation timings of the beams.

The above-described cross-section profiles of the electron beam 1 and the laser beam 3 measured by the profile measuring device 30 according to the invention are momentary cross-section profiles. Accordingly, only from these single profiles, the focuses and the incident angles of the beams cannot be measured.

For this reason, according to the invention, the linear actuator 42 continuously move the target plate 31, the first profile measuring device 37, and the second profile measuring device 38 by a distance exceeding its length in the x direction. From a number of the cross-section profiles continuously obtained at that time, the three-dimensional profiles of the electron beam 1 and the laser beam 3 are created.

In addition, in the case where the electron beam 1 and the laser beam 3 are a pulse beam, the three-dimensional profiles of the beams cannot be quickly and simultaneously measured. Accordingly, in relation to the oscillation timings of the beams, a number of profile data is stored in the storage device (not shown), and consolidated to create the temporal changes in the three-dimensional profiles of the electron beam 1 and the laser beam 3.

When the three-dimensional profiles of the electron beam 1 and the laser beam 3 are obtained, the focuses and the incident angles of the beams can be then measured, as shown in FIG. 3A.

Further, for example, in the state in which both of them are not matched with each other, the focus and the incident angle of the electron beam 1 are difficult to adjust in general. Accordingly, by adjusting the position of the reflection mirror for the laser beam 3 or the condenser, the focuses and the incident angles of the beams are matched with each other, as shown in FIG. 3B.

In addition, the state in which the beams do not simultaneously pass through the focus, as shown in FIG. 3C, can be confirmed from the temporal changes in the three-dimensional profiles.

In this case, the arrival time of the pulse electron beam 1 to the collision point 2*a* or the arrival time of the laser beam 3 to the collision point 2*a* is controlled by the synchronization device 19. Therefore, as shown in FIG. 3D, control can be performed so that the electron beam 1 and the laser beam 3 simultaneously pass through the focus.

As described above, according to the invention, by accurately measuring four-dimensional parameters (three-dimensional space and temporal axis) of the electron beam 1 and the laser beam 3 in the vicinity of the collision point in the X-ray generating device using the collision of the electron beam and the laser beam, a complete overlap of the electron beam and the laser beam in a space of four dimensions is realized, and generation of X-ray is maximized.

In general, in a collision device for the electron beam and the laser beam, one profile measuring device has been installed at a point which is estimated as the collision point. However, in this case, only the positions and profiles of the beams at the position of the profile measuring device can be measured.

Therefore, in this case, the beam waists (focuses) of the electron beam and the laser beam cannot be specified. For this reason, in order to specify the beam waists (focuses), it is necessary to adjust a beam optical system by: assuming the installation position of the profile measuring device as the focus position; and changing a convergence strength of a quadrupole magnet so as to minimize the profiles on the profile measuring device.

In addition, it is impossible to specify the incident angle on the collision point when adjusting the beam optical system. Therefore, improvement in collision efficiency of the electron beam and the laser beam had its limit.

In order to improve the collision efficiency, it is particularly necessary to match the narrowed focus and the incident angle of the electron beam with those of the laser beam and allow the timing for passing through the collision point (position of beam waist) of the electron beam to collide with that of the laser beam.

According to the invention, it is possible to accurately measure the spatial and temporal distributions of the electron beam and the laser beam at the collision point of the beams. Therefore, the electron beam can be allowed to collide with the laser beam as planned, and the X-ray can be generated with the high collision efficiency.

Further, M2 of the laser beam and the emittance and Twiss parameter of the electron beam, which are important to calculate the intensity of the X-ray at the time of collision, can be directly measured at the collision point without breaking down the optical system for the electron beam or the laser beam.

In general, the electron beam is measured according to a Q-scan method. However, since it is necessary to change an error of a K value of a Q magnet for convergence, a distance error from the Q magnet to the profile measuring device, and the K value, there are causes which produce an error in measurement, such as hysteresis of an electromagnetic material. According to the invention, since the profile measuring device is moved with, for example, a several tens of micrometer accuracy and the profiles at each position are measured, the above problem is not generated.

Herein, difference points between the invention and the profile measuring means disclosed in Non-Patent Document 2 will be described again.

There is the most different point from the prior art in that the states of the electron beam and the laser beam can be obtained in four dimensions. Data which can be measured using a conventional stationary monitor is only states when the beams pass through the stationary monitor, and complete prediction of the pulse state (spatial and temporal axes) at the position of the monitor can not be performed. That is, there is a large difference between a theoretical orbit analysis simulation and an actual model, and it is very difficult to reflect a complete position and state, which are derived in theory, in the actual model.

Further, as shown in Non-Patent Document 2, when a monitor is provided at each of three predetermined positions, it is impossible to completely trace the position of focus and the pulse state. For example, the stationary monitor cannot grasp the position of the focus in a certain state (a distinction of an apparent focus and the focus).

In addition, matching the temporal axis of the pulse laser beam with that of the pulse electron beam is impractical.

Accordingly, as described above, temporally and spatially tracing the orbits of the laser beam and the electron beam is necessary and the simplest way for realizing the complete collision.

The invention provides a device having a mechanism capable of confirming the states of the laser beam and the electron beam at each arbitrary position per a unit of 10 μm, and easily solves the above problems.

In other words, with indirect measurement (the states (spatial position, temporal position, tilt) at the collision position are guessed from the state measured by the stationary monitor), the complete collision cannot be realized. Therefore, like the invention, direct measurement (all of the states (special position, temporal position, tilt) are estimated by scanning the states along the advancing directions (the axial directions) of the electron beam and the laser beam) is necessary for the complete collision.

It is to be understood that the invention is not limited to the above-describe embodiments and that various changes and modifications can be made without departing from the scope and spirit of the invention. For example, for the profile measuring device, a known fluorescent screen, wire scanner, and knife-edge scanner can be used.

The invention claimed is:

1. A device for measuring profiles of an electron beam and a laser beam comprising:

a profile measuring device for measuring cross-section profiles of the beams in the vicinity of a collision position where the electron beam and the laser beam are brought into frontal collision; and a moving device for continuously moving the profile measuring device in a predetermined direction which substantially coincides with the axial directions of the beams.

2. The device for measuring profiles of an electron beam and a laser beam according to claim 1, further comprising a profile creating device for creating temporal changes in three-dimensional profiles of the beams based on the cross-section profiles measured by the profile measuring device, the position of the profile measuring device in the predetermined direction, and the oscillation timings of the beams.

3. The device for measuring profiles of an electron beam and a laser beam according to claim 1, wherein the moving device includes a linear actuator for continuously moving the profile measuring device in the predetermined direction and a position detecting device for detecting the position of the profile measuring device in the predetermined direction.

4. The device for measuring profiles of an electron beam and a laser beam according to claim 1, wherein the profile measuring device includes a flat target plate which is disposed at a predetermined angle with respect to the predetermined direction, a first photodetector for measuring a two-dimensional profile of an optical transition radiation generated by collision of the target plate with the electron beam, and a second photodetector for measuring a two-dimensional profile of the laser beam reflected on the target plate.

5. The device for measuring profiles of an electron beam and a laser beam according to claim 1, wherein the profile measuring device includes a flat target plate which is disposed at a predetermined angle with respect to the predetermined direction, a single photodetector for measuring two-dimensional profiles of an optical transition radiation and the laser beam, a first reflection mirror system for directing the optical transition radiation generated by collision of the target plate with the electron beam to the photodetector, and a second reflection mirror system for directing the laser beam reflected on the target plate to the photodetector.

6. The device for measuring profiles of an electron beam and a laser beam according to claim 1, wherein the profile measuring device includes a single photodetector for measuring two-dimensional profiles of an optical transition radiation and the laser beam, a first flat target plate which is disposed at a predetermined angle with respect to the predetermined direction and directs the optical transition radiation generated by collision with the electron beam to the photodetector, and a second target plate which is disposed at a predetermined angle with respect to the predetermined direction and reflects the laser beam to the photodetector.

7. The device for measuring profiles of an electron beam and a laser beam according to claim 1, wherein the profile measuring device includes a first profile measuring device which is disposed at a right angle with respect to the predetermined direction and measures a two-dimensional profile of the electron beam and a second profile measuring device which is disposed at a right angle with respect to the predetermined direction and measures a two-dimensional profile of the laser beam.

8. A method of measuring profiles of an electron beam and a laser beam, the method comprising:

a continuous moving step of continuously moving a profile measuring device for continuously measuring cross-section profiles of the beams in the vicinity of a collision position where the electron beam and the laser beam are brought into frontal collision in a predetermined direction which substantially coincides with the axial directions of the beams; and a profile creating step of creating temporal changes in three-dimensional profiles of the beams based on the cross-section profiles obtained in the continuous moving step, the position of the profile measuring device in the predetermined direction, and the oscillation timings of the beams.

* * * * *